United States Patent
Chien et al.

(10) Patent No.: US 10,419,380 B2
(45) Date of Patent: Sep. 17, 2019

(54) ELECTRONIC DEVICE AND METHOD FOR ADJUSTING MESSAGE LOG

(71) Applicant: Chiun Mai Communication Systems, Inc., New Taipei (TW)

(72) Inventors: How-Wen Chien, New Taipei (TW); Sung-Chieh Chang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 234 days.

(21) Appl. No.: 15/441,269

(22) Filed: Feb. 24, 2017

(65) Prior Publication Data
US 2017/0250937 A1 Aug. 31, 2017

(30) Foreign Application Priority Data
Feb. 26, 2016 (CN) .......................... 2016 1 0112559

(51) Int. Cl.
*H04L 12/00* (2006.01)
*H04L 12/58* (2006.01)

(52) U.S. Cl.
CPC ............ *H04L 51/16* (2013.01); *H04L 51/046* (2013.01)

(58) Field of Classification Search
CPC ....... H04L 41/069; H04L 51/16; H04L 51/24; H04L 51/05
USPC .............. 709/206, 223, 207; 726/12, 13, 22; 713/168, 176, 178
See application file for complete search history.

(56) References Cited

U.S. PATENT DOCUMENTS

| | | | | |
|---|---|---|---|---|
| 5,919,239 A | * | 7/1999 | Fraker | G01S 5/0027 340/573.1 |
| 6,879,995 B1 | * | 4/2005 | Chinta | H04L 67/24 709/204 |
| 7,120,685 B2 | * | 10/2006 | Ullmann | G06F 11/0709 709/224 |
| 7,458,006 B2 | * | 11/2008 | Cavanna | H03M 13/091 714/757 |
| 7,986,282 B2 | * | 7/2011 | Zerphy | G06F 3/1431 345/1.3 |
| 8,079,081 B1 | * | 12/2011 | Lavrik | H04L 41/069 709/223 |
| 8,156,553 B1 | * | 4/2012 | Church | G06Q 10/06 709/224 |
| 8,552,847 B1 | * | 10/2013 | Hill | G06F 3/016 340/407.1 |
| 2006/0059257 A1 | * | 3/2006 | Collard | G06F 9/546 709/224 |

(Continued)

FOREIGN PATENT DOCUMENTS

| | | |
|---|---|---|
| CN | 102946344 A | 2/2013 |
| CN | 104104588 A | 10/2014 |
| WO | 2012062084 A1 | 5/2012 |

*Primary Examiner* — Frantz Coby
(74) *Attorney, Agent, or Firm* — ScienBiziP, P.C.

(57) ABSTRACT

A method for adjusting a message log includes logging messages to the message log when the messages are received. The messages are displayed on a display device of an electronic device. The message log is adjusted according to a predetermined adjusting operation when the predetermined adjusting operation is detected. The adjusted message log is displayed on the display device, and the predetermined adjusting operation is sent to one or more other electronic devices that are in communication with the electronic device.

18 Claims, 5 Drawing Sheets

(56) References Cited

U.S. PATENT DOCUMENTS

| | | | |
|---|---|---|---|
| 2006/0174165 A1* | 8/2006 | Shaffer | G06F 11/3476 714/38.13 |
| 2006/0217831 A1* | 9/2006 | Butterworth | B65H 26/00 700/126 |
| 2007/0241988 A1* | 10/2007 | Zerphy | G06F 3/1431 345/1.1 |
| 2007/0300025 A1* | 12/2007 | Korlepara | G06F 3/0605 711/162 |
| 2009/0265738 A1* | 10/2009 | Liao | H04N 5/44543 725/40 |
| 2011/0067008 A1* | 3/2011 | Srivastava | G06F 11/3466 717/128 |
| 2012/0215907 A1* | 8/2012 | Chung | G06F 21/552 709/224 |
| 2014/0052708 A1* | 2/2014 | Alonso Lago | G06F 17/30864 707/709 |
| 2014/0123024 A1 | 5/2014 | Bau et al. | |
| 2014/0282031 A1* | 9/2014 | Hinterbichler | G06F 11/3656 715/738 |
| 2015/0142385 A1* | 5/2015 | Otsuka | G06F 11/0706 702/182 |
| 2016/0173680 A1* | 6/2016 | Yong | H04M 1/72552 455/466 |

* cited by examiner

ELECTRONIC DEVICE AND METHOD FOR ADJUSTING MESSAGE LOG

CROSS-REFERENCE TO RELATED APPLICATIONS

This application claims priority to Chinese Patent Application No. 201610112559.2 filed on Feb. 26, 2016, the contents of which are incorporated by reference herein.

FIELD

The subject matter herein generally relates to managing technology, and particularly to an electronic device and a method for adjusting a message log.

BACKGROUND

Generally, a user of a first electronic device can receive messages from a second electronic device using an instant message software that is installed in both of the first and second electronic devices. However, when the user replied to one of the received messages, a user of the second electronic device may misunderstand which message is corresponding to the replied message.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
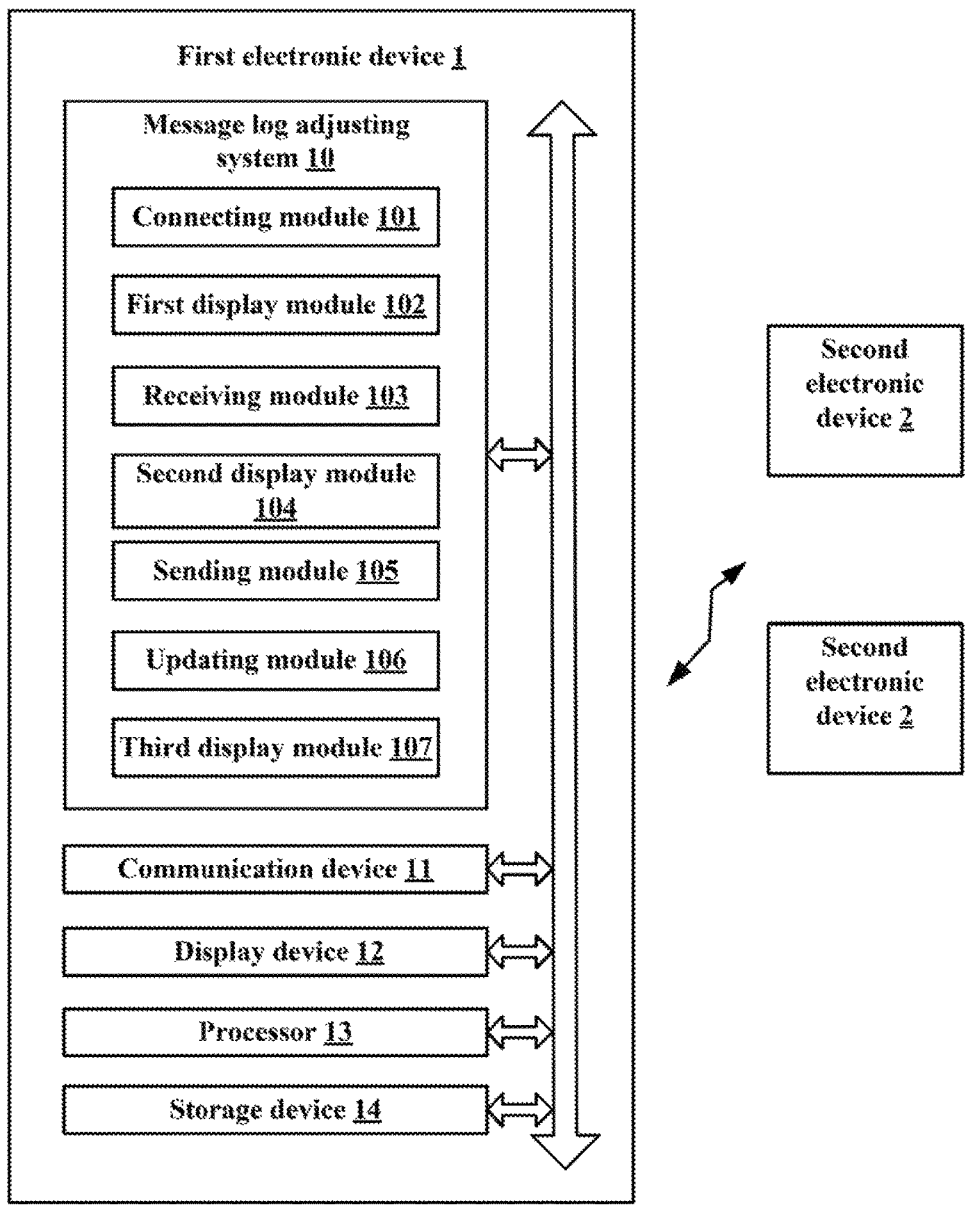
FIG. 1 is a block diagram of an exemplary embodiment of a first electronic device in communication with one or more second electronic devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" exemplary embodiment in this disclosure are not necessarily to the same exemplary embodiment, and such references mean "at least one."

Furthermore, the term "module", as used herein, refers to logic embodied in hardware or firmware, or to a collection of software instructions, written in a programming language, such as, JAVA, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 is a block diagram of an exemplary embodiment of a first electronic device 1 in communication with one or more second electronic devices 2. Depending on the exemplary embodiment, the first electronic device 1 can include, but are not limited, a message log adjusting system 10, a communication device 11, a display device 12, at least one processor 13, and a storage device 14. In at least one exemplary embodiment, the first electronic device 1 and the one or more second electronic devices 2 can be mobile phones, tablet computers, personal digital assistants (PDAs), wearable devices, digit televisions, or any other suitable devices such as display screens used in vehicles.

In at least one exemplary embodiment, the message log adjusting system 10 is an instant message software. The message log adjusting system 10 can receive messages sent by the first electronic device 1 and the one or more second electronic devices 2 which are in communication with the first electronic device 1. The message log adjusting system 10 further can log the received messages to a message log according to time sequence, and display the received messages on the display device 12. The message log adjusting system 10 further can adjust the message log in response to a predetermined adjusting operation when the predetermined adjusting operation is detected. The message log adjusting system 10 further can send the predetermined adjusting operation to the one or more second electronic devices 2 through the communication device 11. Details will be provided in following paragraphs.

In at least one exemplary embodiment, the message log can include, but is not limited to, messages sent by the first electronic device 1 and the one or more electronic devices 2, and time information of each of the messages. In at least one exemplary embodiment, the message log can further include sender information of each of the messages. The time information can be sending time when the message is sent out or can be receiving time when the message is received. In at least one exemplary embodiment, the time information of each of the messages can be different from each other, and the time information can be used to identify each message. In other words, the time information of each message can be used as an identification of the each message.

In at least one exemplary embodiment, the communication device 11 can be used to establish communication connections between the first electronic device 1 and the one or more second electronic devices 2. In at least one exemplary embodiment, each of the one or more second electronic devices 2 installs the message log adjusting system 10. Accordingly, the message log adjusting system 10 installed in each of the one or more second electronic devices 2 can also have same function with the message log adjusting system 10 installed in the first electronic device 1. For example, the message log adjusting system 10 installed in each of the one or more second electronic devices 2 can also receive messages sent by the first electronic device 1 and the one or more second electronic devices 2, and can log the received messages to a message log of the each of the one or more second electronic devices 2.

In at least one exemplary embodiment, the communication device 11 can be a wireless communication device such as a wireless network card, or a Bluetooth device. In other exemplary embodiments, the communication device 11 can be a wired network card or a mobile communication network device. In at least one exemplary embodiment, the display device 12 can be used to display all kinds of information of the first electronic device 1. In at least one exemplary embodiment, the display device 12 also can be used to receive input operations of a user of the first electronic device 1. The display device 12 can be a capacitive touch screen or a resistive touch screen. In other exemplary embodiments, when the display device 12 cannot receive the input operations, the first electronic device 1 can use another device such as a mouse, a keyboard, or a trackball to receive the input operations. In at least one exemplary embodiment, when the display device 12 cannot receive the input operations, the display device 12 can be a liquid crystal display, a cathode-ray tube display, a plasma display, or an organic light emitting diode display.

In at least one exemplary embodiment, the at least one processor 13 can execute instructions of programs installed in the first electronic device 1, and can control the first electronic device 1 to execute corresponding operations. The storage device 14 can be used to store the instructions and data information. In at least one exemplary embodiment, the storage device 14 can be an internal storage device such as a memory of the first electronic device 1. In other exemplary embodiments, the storage device 14 can be external storage device of the first electronic device 1. For example, the storage device 14 can be a secure digital card, a smart media card, or a flash card.

In at least one exemplary embodiment, the message log adjusting system 10 can include a connecting module 101, a first display module 102, a receiving module 103, a second display module 104, a sending module 105, an updating module 106, and a third display module 107. The modules 101-107 include computer instructions or codes in form of one or more programs that may be executed by the at least one processor 13.

Figure 2:
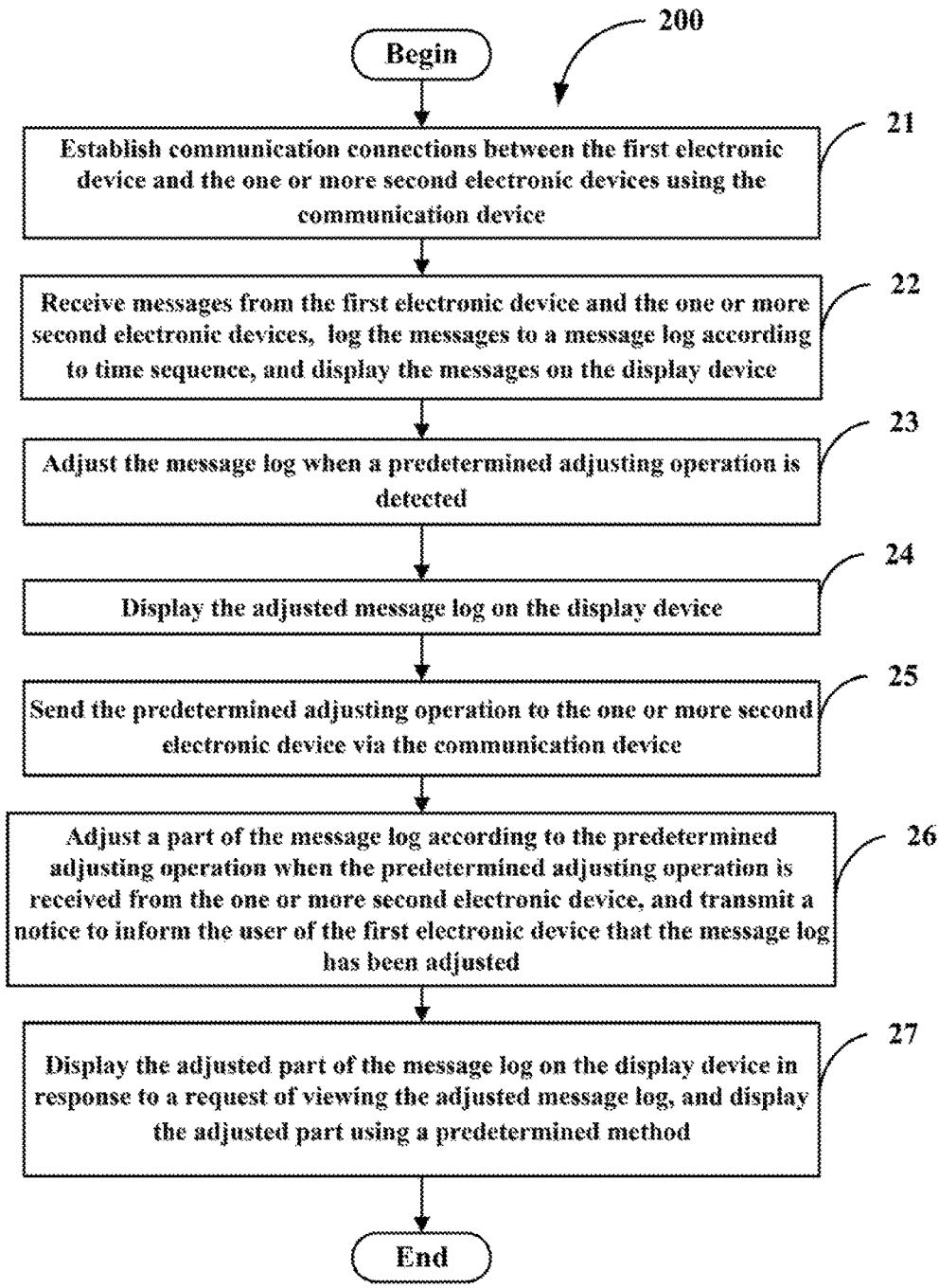
FIG. 2 illustrates a flowchart of an exemplary embodiment of a method of adjusting a message log.

FIG. 2 illustrates an exemplary embodiment of a flowchart of a method of adjusting a message log of the first electronic device 1. The example method 200 is provided by way of example, as there are a variety of ways to carry out the method. The method 200 described below can be carried out using the configurations illustrated in FIG. 1, for example, and various elements of these figures are referenced in explaining example method 200. Each block shown in FIG. 2 represents one or more processes, methods, or subroutines, carried out in the example method 200. Additionally, the illustrated order of blocks is by example only and the order of the blocks can be changed according to the present disclosure. The example method 200 can begin at block 21. Depending on the exemplary embodiment, additional steps can be added, others removed, and the ordering of the steps can be changed.

At block 21, the connecting module 101 can establish communication connections between the first electronic device 1 and the one or more second electronic devices 2 using the communication device 11.

In at least one exemplary embodiment, each of the one or more second electronic devices 2 installs the message log adjusting system 10. When the first electronic device 1 is in communication with the second electronic device 2, both the first electronic device 1 and the second electronic device 2 can send messages to each other, and can receive messages from each other using the message log adjusting system 10. In other words, the user of the first electronic device 1 and a user of the second electronic device 2 can send messages to each other, and can receive messages from each other via the message log adjusting system 10. When the first electronic device 1 is in communication with a plurality of second electronic devices 2, the first electronic device 1 and the plurality of second electronic devices 2 can send messages to each other, and can receive messages from each other using the message log adjusting system 10. In at least one exemplary embodiment, the plurality of second electronic devices 2 can be electronic devices of a preset group.

In other exemplary embodiments, each of the one or more second electronic devices 2 can be a server that installs the message log adjusting system 10. The first electronic device 1 can communicate with the server through the communication device 11, and one or more other electronic devices can also communicate with the server. The first electronic device 1 can send messages to the one or more other electronic devices through the server, and can receive messages from the one or more other electronic devices through the server.

It should be noted that, the communication device 11 can be a communication device that can connect with the internet, the connecting module 101 can connects the first electronic device 1 with the internet through the communication device 11, and can connect the first electronic device 1 with other electronic devices through the internet.

At block 22, the first display module 102 can receive messages from the first electronic device 1 and the one or more second electronic devices 2. The first display module 102 can further log the messages to a message log according to time sequence, and can display the messages on the display device 12. In at least one embodiment, the first display module 102 can display a number of latest messages on the display device 12 according to the time sequence. In at least one embodiment, the latest messages can be defined as messages having sending time or receiving time within a predetermined time period (e.g., within last ten minutes).

As mentioned above, the message log can include, but is not limited to, the messages and time information of each of the messages. The time information can be sending time when the message is sent out or can be receiving time when the message is received. In at least one exemplary embodiment, the message log can further include sender information of each of the messages.

In at least one exemplary embodiment, when the first display module 102 receives a message from the first electronic device 1 or from the second electronic device 2, the first display module 102 can further obtain time information of the message, and log the message to the message log according to the time information of the message. In at least one exemplary embodiment, the first display module 102 can store the message log in the storage device 14.

In at least one exemplary embodiment, the first electronic device 1 can directly connect with each of the one or more second electronic devices 2 that is installed with the message log adjusting system 10. The first displaying module 102 can directly receive messages from the one or more second electronic devices 2 and can directly receive the time information of each of the messages from the one or more second electronic devices 2.

In other exemplary embodiments, when the first electronic device 1 connects with other electronic devices via the server, and the other electronic devices being installed with the message log adjusting system 10, the first display module 102 can receive messages from the other electronic devices via the server, or in alternatively, the server receives the messages from the other electronic devices, and logs the messages to a message log, and sends the message log to each of the first electronic device 1 and the other electronic devices.

At block 23, the receiving module 103 can adjust the message log when a predetermined adjusting operation is detected.

In at least one exemplary embodiment, the predetermined adjusting operation can be an inserting operation of inserting a message into the message log, a moving operation of moving a message in the message log, or a deleting operation of deleting a message from the message log.

In at least one exemplary embodiment, when the receiving module 103 detects an inserting position of inserting a message in response to user input, and receives a message to be inserted, the receiving module 103 can determine that the inserting operation is detected. In at least one exemplary embodiment, when two adjacent messages of the message log are simultaneously selected and are dragged away from each other, the receiving module 103 can determine the inserting position of inserting the message is between positions of the two adjacent messages. In at least one exemplary embodiment, the two adjacent messages can be defined as messages having adjacent sending time or adjacent receiving time. In other exemplary embodiments, when a message of the message log is long pressed, the receiving module 103 can determine the inserting position of inserting the message is located above or below a position of the long pressed message. The message is long pressed can be defined as the message is continuously pressed more than a predetermined period of time such as 5 seconds.

Figure 3:
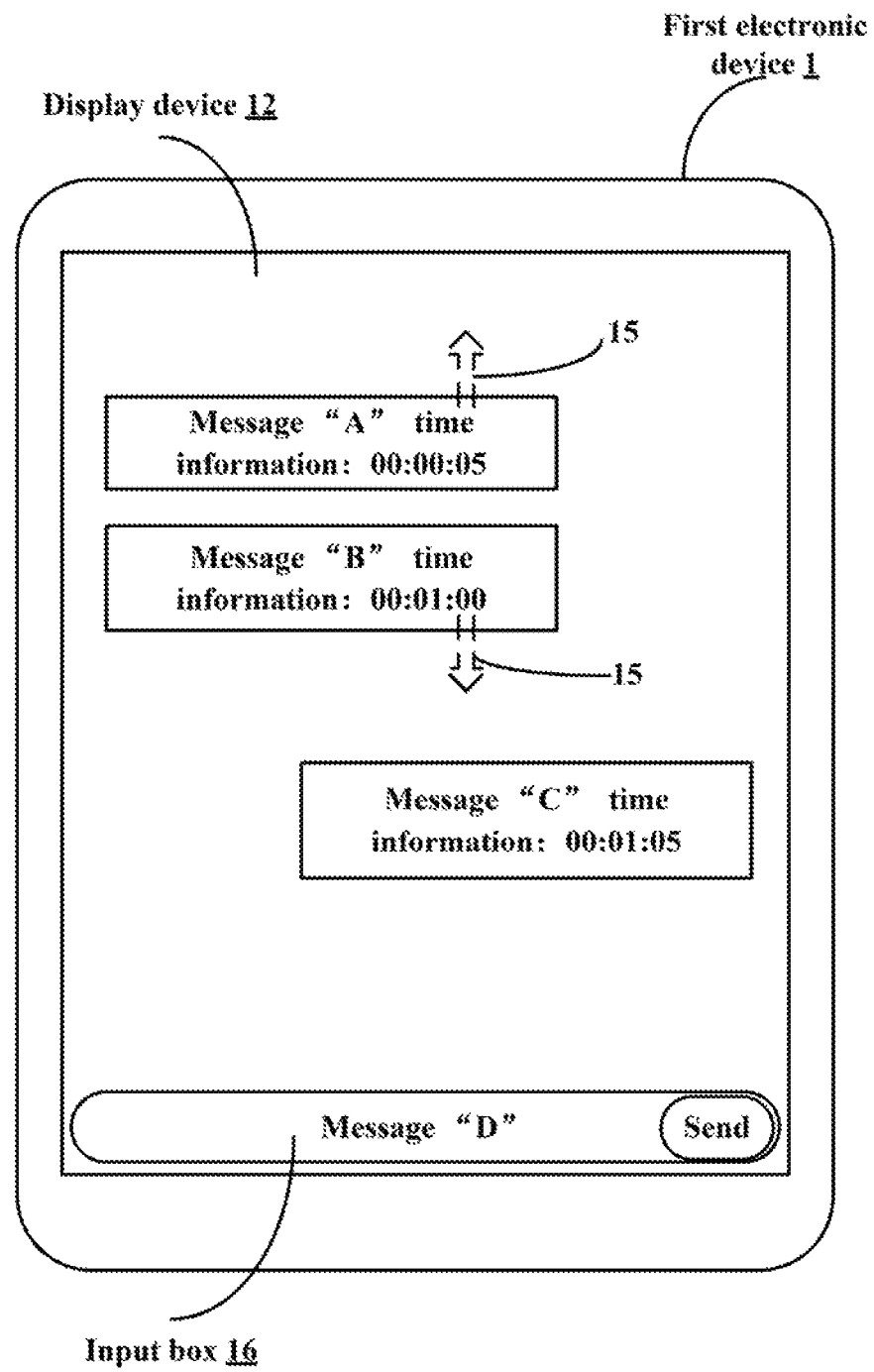
FIG. 3 illustrates an example of inserting a message.

Referring to FIG. 3, messages "A", "B", "C" are messages have been sent out, the messages "A" and "B" are sent from the second electronic device 2, and the messages "C" is sent from the first electronic device 1. Messages "A", "B", "C" have been logged to the message log, and a message "D" in an input box 16 is to be sent and has not been logged to the message log. Two dotted arrows 15 show messages "A" and "B" are simultaneously dragged away from each other. The receiving module 103 can determine the inserting operation of inserting the message "D" is detected when the messages "A" and "B" are simultaneously dragged away from each other and the message "D" is detected from the input box 16. The receiving module 103 can further determine a position of inserting the message "D" is between positions of the messages "A" and "B". The receiving module 103 can insert the message "D" between the positions of the messages "A" and "B" when the inserting operation of inserting the message "D" is detected.

In at least one exemplary embodiment, when a message in the message log is selected by long pressing and is dragged from an original position of the message to a target position of the moving of the message, the receiving module 103 can determine that the moving operation is detected. The receiving module 103 can move the message from the original position to the target position when the moving operation is detected.

Figure 4:
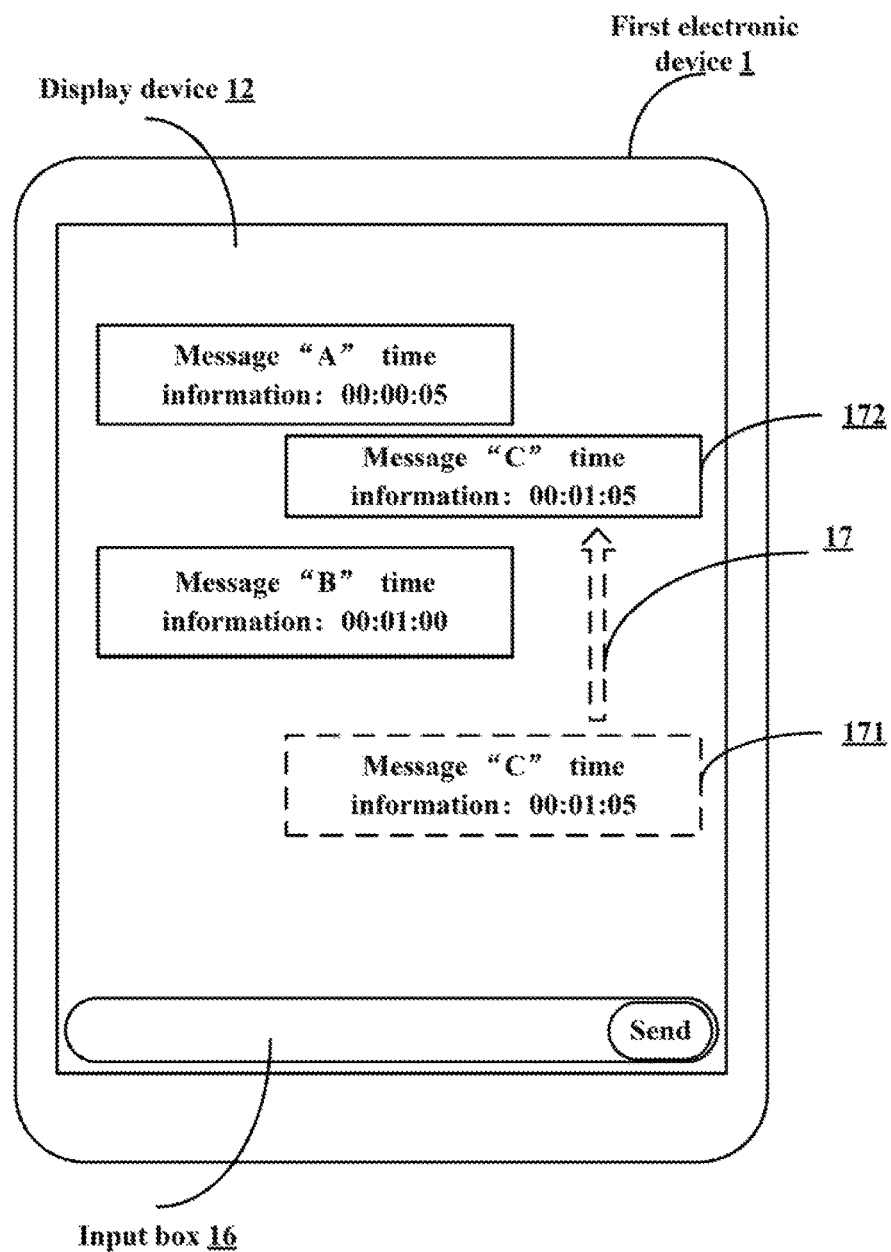
FIG. 4 illustrates an example of moving a message.

Referring to FIG. 4, messages "A", "B", "C" are messages have been sent out, the messages "A" and "B" are sent from the second electronic device 2, and the messages "C" is sent from the first electronic device 1. Messages "A", "B", "C" have been logged to the message log. A dotted arrow 17 show the message "C" is dragged away from an original position 171 to a position 172. When the message "C" is released at the position 172, the receiving module 103 can determine the moving operation of moving the message "C" is detected and can determine the position 172 is the target position. The receiving module 103 can further move the message "C" from the original position 171 to the position 172 when the moving operation of moving the message "C" is detected.

In at least one exemplary embodiments, when a message in the message log is selected by dragging the message towards a predetermined direction (e.g., towards left or right of the message), the receiving module 103 can determine that the deleting operation of deleting the message is detected. The receiving module 103 can further delete the message from the message log.

Figure 5:
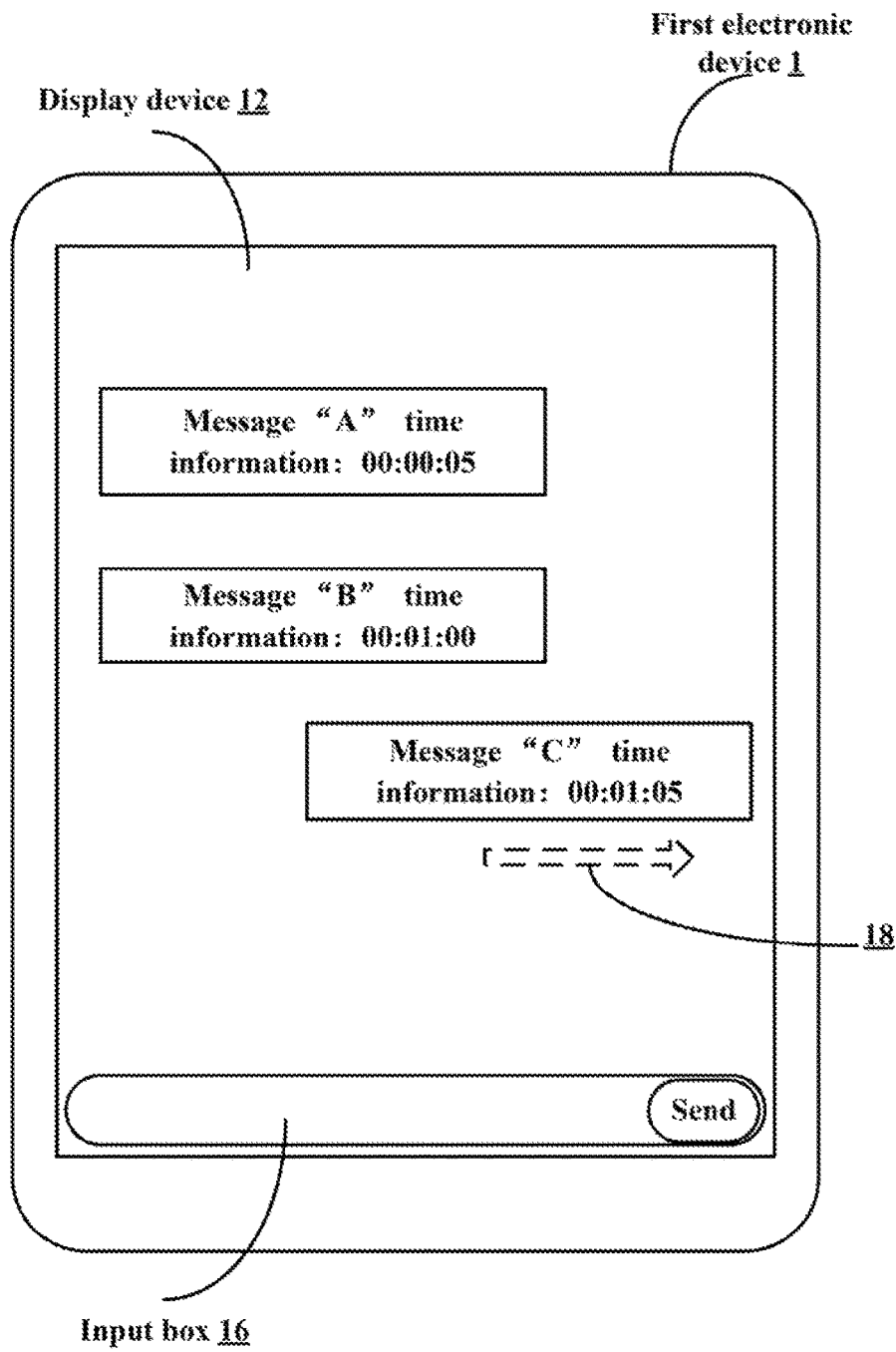
FIG. 5 illustrates an example of deleting a message.

Referring to FIG. 5, messages "A", "B", "C" are messages have been sent out, the messages "A" and "B" are sent from the second electronic device 2, and the messages "C" is sent from the first electronic device 1. Messages "A", "B", "C" have been logged to the message log. When the message "C" is dragged towards the predetermined direction such as a dotted arrow 18 shows, the receiving module 103 can determine that an deleting operation of deleting the message "C" is detected. The receiving module 103 can further delete the message "C" from the message log.

In at least one exemplary embodiments, if the first electronic device 1 is a wearable device, the first electronic device 1 can include a motion sensor for detecting a motion of the user of the first electronic device 1. In at least one exemplary embodiments, the detecting of the inserting operation, the detecting of the moving operation, and the detecting of the deleting operation can further include the detecting of the motion of the user. For example, the motion of the user can be a predetermined motion of a finger or an arm. In at least one exemplary embodiments, the motion sensor be an acceleration sensor or a distance sensor.

At block 24, the second displaying module 104 can display the adjusted message log on the display device 12. In at least one exemplary embodiments, the adjusted message log in which the message is adjusted is displayed on the display device 12.

At block 25, the sending module 105 can send the predetermined adjusting operation to the one or more second electronic device 2 via the communication device 11, to enable each of the one or more second electronic device 2 can correspondingly adjust a message log of each of the one or more second electronic device 2.

In at least one exemplary embodiments, when the predetermined adjusting operation is the inserting operation, the sending module 105 can send content of the message that is to be inserted together with the inserting position of the message to the one or more second electronic device 2, thus each of the one or more second electronic device 2 can correspondingly adjust the message log of each of the one or more second electronic device 2 by inserting the message to the inserting position. When the predetermined adjusting operation is the moving operation, the sending module 105 can send the identification of the message that is to be moved together with the target position of the message to the one or more second electronic device 2, thus each of the one or more second electronic device 2 can correspondingly adjust the message log of each of the one or more second electronic device 2 by moving the message to the target position. When the predetermined adjusting operation is the deleting operation, the sending module 105 can send an identification of the message that is to be deleted to the one or more second electronic device 2, thus each of the one or more second electronic device 2 can correspondingly adjust the message log of each of the one or more second electronic device 2 by deleting the message from the message log of each of the one or more second electronic device 2.

In at least one exemplary embodiments, the identification of the message can be the time information of the message. The sending module 105 can indicate any one message of the message log using the identification of the any one message. The sending module 105 also can indicate a position of any one message of the message log using the identification of the any one message.

For example, it is assumed that time information of the message "A" is "00:00:05", time information of the message "B" is "00:10:00", and time information of the message "C" is "00:10:05". When the message "D" is to be inserted between positions of the messages "A" and "B", the sending module 105 can send content of the message "D" together with the inserting position of the message "D" that is indicated using time information of messages "A" and "B"(e.g., "00:00:05" and "00:10:00"). When the message "C" is to be moved between positions of the messages "A" and "B", the sending module 105 can send the identification of the message "C" together with the target position of the message "C" that is indicated using time information of messages "A" and "B"(e.g., "00:00:05" and "00:10:00"). When the message "C" is to be deleted from the message log, the sending module 105 can send the identification of the message "C" (e.g., "00:10:05").

At block 26, the updating module 106 can adjust a part of the message log according to the predetermined adjusting operation when the predetermined adjusting operation is received from the one or more second electronic device 2. The updating module 106 can further transmit a notice to inform the user of the first electronic device 1 that the message log has been adjusted.

In at least one exemplary embodiment, the updating module 106 can transmit the notice by displaying a predetermined prompt message on the display device 12. In at least one exemplary embodiment, the predetermined prompt message can be selected by the user of the first electronic device 1. When the predetermined prompt message is selected by the user, the updating module 106 can determine that the user wants to view the message log that has been adjusted, and can determine a request of viewing the adjusted message log is received.

In other exemplary embodiments, the updating module 106 can transmit the notice by directly displaying the adjusted part of the message log on the display device 12. The updating module 106 can further display the adjusted part in a predetermined method. In at least one exemplary embodiment, the predetermined method can be displaying the adjusted part using a predetermined color such as a red color. In other exemplary embodiments, the predetermined method can be displaying the adjusted part using a predetermined background color such as a green color. For example, the updating module 106 can display the adjusted message "C" on the display device 12 using the red color.

At block 27, the third displaying module 107 can display the adjusted part of the message log on the display device 12 in response to the request of viewing the adjusted message log. The third displaying module 107 can display the adjusted part using the predetermined method.

It should be emphasized that the above-described exemplary embodiments of the present disclosure, including any particular exemplary embodiments, are merely possible examples of implementations, set forth for a clear understanding of the principles of the disclosure. Many variations and modifications can be made to the above-described exemplary embodiment(s) of the disclosure without departing substantially from the spirit and principles of the disclosure. All such modifications and variations are intended to be included herein within the scope of this disclosure and protected by the following claims.

What is claimed is:

1. A method for adjusting a message log of an electronic device, the method comprising:
    displaying messages of a message log on a display device of the electronic device, wherein the messages are logged to the message log according to time information of each of the messages;
    determining an inserting position for a message to be inserted, wherein when two adjacent messages of the message log are simultaneously selected and are dragged away from each other, a position between the two adjacent messages is determined as the inserting position; and
    inserting the message to be inserted to the inserting position.

2. The method according to claim 1,
    wherein a sending time when the message is sent out by a sender is set as the time information of the message or a receiving time when the message is received by the electronic device is set as the time information of the message.

3. The method according to claim 2,
    wherein the two adjacent messages are two messages of the message log having adjacent sending time or adjacent receiving time.

4. The method according to claim 1,
    further comprising:
    deleting a message from the message log when the message is dragged towards a predetermined direction.

5. The method according to claim 1,
    further comprising:
    moving a message of the message log from an original position to a target position when a long press is applied to the message and the message is dragged from the original position to the target position.

6. The method according to claim 1, wherein the message to be inserted is a message which has not been logged to the message log.

7. An electronic device, comprising:
    a display device;
    a storage device; and
    at least one processor, wherein the storage device stores one or more programs, which when executed by the at least one processor, cause the at least one processor to:
    display messages of a message log on the display device, wherein the messages are logged to the message log according to time information of each of the messages;
    determine an inserting position for a message to be inserted, wherein when two adjacent messages of the message log are simultaneously selected and are dragged away from each other, a position between the two adjacent messages is determined as the inserting position; and
    insert the message to be inserted to the inserting position.

8. The electronic device according to claim 7,
    wherein a sending time when the message is sent out by a sender is set as the time information of the message or a receiving time when the message is received by the electronic device is set as the time information of the message.

9. The electronic device according to claim 8,
wherein the two adjacent messages are two messages of the message log having adjacent sending time or adjacent receiving time.

10. The electronic device according to claim 7,
wherein the at least one processor is further caused to:
delete a message from the message log when the message is dragged towards a predetermined direction.

11. The electronic device according to claim 7,
wherein the at least one processor is further caused to:
move a message of the message log from an original position to a target position when a long press is applied to the message and the message is dragged from the original position to the target position.

12. The electronic device according to claim 7, wherein the message to be inserted is a message which has not been logged to the message log.

13. A non-transitory storage medium having stored thereon instructions that, when executed by a processor of an electronic device, causes the processor to perform a method for adjusting a message log, wherein the method comprises:
displaying messages of a message log on a display device of the electronic device, wherein the messages are logged to the message log according to time information of each of the messages;
determining an inserting position for a message to be inserted, wherein when two adjacent messages of the message log are simultaneously selected and are dragged away from each other, a position between the two adjacent messages is determined as the inserting position; and
inserting the message to be inserted to the inserting position.

14. The non-transitory storage medium according to claim 13,
wherein a sending time when the message is sent out by a sender is set as the time information of the message or a receiving time when the message is received by the electronic device is set as the time information of the message.

15. The non-transitory storage medium according to claim 14,
wherein the two adjacent messages are two messages of the message log having adjacent sending time or adjacent receiving time.

16. The non-transitory storage medium according to claim 13,
wherein the method further comprises:
deleting a message from the message log when the message is dragged towards a predetermined direction.

17. The non-transitory storage medium according to claim 13,
wherein the method further comprises:
moving a message of the message log from an original position to a target position when a long press is applied to the message and the message is dragged from the original position to the target position.

18. The non-transitory storage medium according to claim 13,
wherein the message to be inserted is a message which has not been logged to the message log.

* * * * *